United States Patent [19]

Ikeda et al.

[11] Patent Number: 5,336,723
[45] Date of Patent: Aug. 9, 1994

[54] PHENOLIC RESIN MOLDING MATERIALS

[75] Inventors: Shinji Ikeda, Fujieda; Keiji Ooi, Tsu; Ken Katoh, Fujieda, all of Japan

[73] Assignee: Sumitomo Bakelite Company Limited, Tokyo, Japan

[21] Appl. No.: 41,461

[22] Filed: Apr. 2, 1993

[30] Foreign Application Priority Data

Sep. 30, 1992 [JP] Japan .................................. 4-262298
Oct. 20, 1992 [JP] Japan .................................. 4-282025

[51] Int. Cl.⁵ .................. C08L 61/10; C08L 61/06; C08L 9/02
[52] U.S. Cl. .................................. 525/139; 525/142; 525/502; 524/494
[58] Field of Search ............... 525/133, 135, 139, 142, 525/502; 524/494

[56] References Cited

U.S. PATENT DOCUMENTS 4,257,926  3/1981  Tanimura et al. .................. 525/135
5,141,992  8/1992  Katoh et al. ......................... 525/135

Primary Examiner—James J. Seidleck
Assistant Examiner—W. Robinson H. Clark
Attorney, Agent, or Firm—Browdy and Neimark

[57] ABSTRACT

Disclosed is a phenolic resin molding material which is mainly composed of (1) 25-55 parts by weight of a phenolic resin containing 60% by weight or more of a resol-type phenolic resin, (2) 2-10 parts by weight of a partially crosslinked NBR, and (3) 35-70 parts by weight of an inorganic filler, on the basis of 100 parts by weight in total of these components.

7 Claims, No Drawings

PHENOLIC RESIN MOLDING MATERIALS

The present invention relates to a phenolic resin molding material which is imparted with highly balanced properties of static strengths such as flexural strength, impact resistance or flexibility and heat resistance and with superior flowability and excellent injection moldability by adding to a phenolic resin mainly composed of a resol-type phenolic resin, a partially crosslinked acrylonitrile-butadiene rubber (partially crosslinked NBR) and an inorganic filler.

Phenolic resin molding materials are excellent in heat resistance, dimensional stability and moldability and have been used in the fields of key industries such as automobiles, electricity and electronics. Recently, it has been positively attempted in the field of automobiles to reduce the cost by substituting glass fiber-reinforced phenolic resin molded products for the metallic parts made of iron, aluminum, zinc and the like.

Thermosetting resin compositions including phenolic resins have the merit of excellent heat resistance, but, on the other hand, they are very brittle and readily crack due to their crosslinked structure. These defects have hindered the extension of the application of the thermosetting resin compositions to the metallic parts.

Many attempts have been made to solve these defects, namely, to impart impact resistance or flexibility to the thermosetting resin compositions. For example, there are known molding materials generally called chipped materials which are made by a Henschel mixer or a super mixer and materials which are made by impregnating glass rovings with a phenolic varnish, drying the rovings to remove the solvent and cutting the resulting prepregs to a suitable length. These molding materials have very high Charpy impact strengths, namely, the former have 5–12 KJ/m$^2$ and the latter have 50–100 KJ/m$^2$, but adhesion between the filler and the substrate decreases, resulting in high reduction of static strengths. Further defect of the latter molding materials is that the molding method is limited to only the compression molding.

The inventors have reported in U.S. Pat. No. 5,141,992 that molding materials excellent in heat resistance and highly balanced in toughness and static strengths can be obtained by adding carboxyl-modified acrylonitrile-butadiene rubbers (carboxyl-modified NBR) to a composition comprising both the resol-type phenolic resin and the novolak-type phenolic resin and reinforcing the composition with inorganic fillers. In this patent specification, use of the carboxyl-modified NBR having an SP value (solubility parameter) of 9–10 is recommended. Since the presence of the carboxyl group causes increase in the SP value, said NBR have butadiene.acrylonitrile bonding ratios different from those of a general NBR having the same SP value. Furthermore, when the resins cure, the carboxyl group participates in the reaction. As a result, the resins to which said carboxyl-modified NBR are added have much higher melt viscosity at the time of molding as compared with the resins to which the general NBR having the same SP value is added. Therefore, when molds of complicated shapes are used, there often occurs poor flow in molding in spite of high heat stability.

As mentioned above, phenolic resin molding materials excellent in heat resistance, well balanced in static strengths and impact resistance or flexibility and besides excellent in flowability have not yet been obtained.

The parts used in engine rooms of automobiles are exposed to the environmental conditions such as the vibrations of 3–40 G, the temperature of 150°–200° C. and the rebound of stones while the automobiles are running. In order to substitute the metallic parts with resins, the resins must have toughness and impact resistance enough to stand the above conditions. Furthermore, molding materials excellent in shaft forcing property and in heat resistance are required as materials for commutators which are motor parts. The inventors have conducted intensive research in an attempt to provide molding materials applicable to these parts. As a result, they have found phenolic resin molding materials excellent in heat resistance, highly balanced in static strengths and impact resistance or flexibility and capable of being injection-molded at a high productivity.

The present invention relates to a phenolic resin molding material mainly composed of (1) 25–55 parts of a phenolic resin containing 60% or more of a resol-type phenolic resin, (2) 2–10 parts of a partially crosslinked NBR and (3) 35–70 parts of an inorganic filler on the basis of 100 parts in total of the components. All parts and percentages here are by weight.

The phenolic resin used here consists of a resol-type phenolic resin alone, or 60% or more of a resol-type phenolic resin (hereinafter referred to as "resol") and 40% or less of a novolak-type phenolic resin (hereinafter referred to as "novolak").

The resol may be a dimethylene ether type or a methylol type alone or a mixture thereof. When the phenolic resin consists of the resol alone, it is preferred to use the dimethylene type resol and the methylol type resol in combination at a ratio of 20:80–60:40. When the phenolic resin comprises the resol and the novolak in combination, it is preferred to use the dimethylene ether resol in an amount of 50% or more as the resol. In these cases, molding materials excellent in injection moldability and in heat resistance and static strengths of the resulting molded articles can be obtained. From the points of handleability of resins and characteristics of molded articles, the resols preferably have a softening point of 70° C. or higher measured by the ball and ring method.

When the resol is used solely as the phenolic resin, heat resistance can be improved without decreasing flexibility of the molded articles.

When the resol and the novolak are used in combination as the phenolic resin, steps for preparation of the molding materials can be easily controlled, and flow characteristics of the molding materials, are further stabilized and besides, toughness and impact resistance of the molded articles are further improved.

The novolaks usable may have any molecular weight and preferred are those which have a relatively higher molecular weight of at least 4000 in weight-average molecular weight and especially preferred are those which have a weight-average molecular weight of 5000–9000. The novolaks tend to increase in the impact strength with increase in their weight-average molecular weight. In the case of using the resol and the novolak in combination, it is considered that use of a high molecular weight novolak having a weight-average molecular weight of at least 4000 gives a homogeneous cured product instead of an aggregate of micro cured products.

Further, when the novolak has a weight-average molecular weight of 9000 or more, the total viscosity is too high and preparation of molding materials becomes difficult, and .even if the molding materials can be prepared, injection molding of the materials tends to be difficult.

In the case of using the resol and the novolak in combination, the ratio of them is preferably 60/40–95/5, and especially preferably 70/30–90/10. When the proportion of the resol is higher than the above range, impact resistance somewhat decreases, and when the proportion of the novolak is higher than the above range, curability of the materials deteriorates.

In the present invention, hexamethylenetetramine is not needed not only when the resol is used alone, but also when the resol and the novolak are used in combination. The novolak which is used in a relatively smaller amount reacts with the resol to cause three-dimensional crosslinking through the whole resin with curing of the resin. Thus, cured products having good characteristics can be obtained.

The partially crosslinked NBR is generally the one prepared by crosslinking a double bond of butadiene with acrylonitrile in the form of monomers and polymerizing a mixture containing a suitable amount of the crosslinked product. The proportion of the crosslinked portion to the normal acrylonitrile-butadiene rubber (normal NBR) is generally 0.1–3%. However, when the proportion of the crosslinked portion is higher, compatibility with the resin is inferior and when it is lower, the effect of crosslinking is not sufficiently exhibited. Thus, the particularly preferred partially crosslinked NBR is the one in which the crosslinked portion is in the range of 0.3–1%. Furthermore, the bonding, ratio of acrylonitrile and butadiene is preferably adjusted to about 9–10 in SP value in consideration of the compatibility with the resol.

The molecular weight of the partially crosslinked NBR is unlimited, but preferably from about 200,000 to about 500,000 considering the rolling workability.

The inorganic fillers include calcium carbonate, calcined clay, uncalcined clay, mica, silica, wollastonite, magnesium hydroxide, aluminum hydroxide, glass fibers, alumina fibers and the like. These may be used each alone or in combination. Especially, use of glass fibers in an amount of at least 50–60% of the fillers is further effective for improving static strengths and impact resistance.

Use of coupling agents such as aminosilane and epoxysilane for enhancing the adhesion between the fillers and the resins is effective for improving strength and heat resistance.

The present invention provides phenolic resin molding materials which can be stably injection-molded and has highly balanced properties of static strengths such as flexural strength and tensile strength, impact strength or flexibility and heat resistance. When the phenolic resin consists of the resol alone, the phenolic resin molding material is mainly composed of 25–55 parts (more preferably 25–40 parts) of the resol, 2–8 parts (more preferably 3–6 parts) of the partially crosslinked NBR, and 40–70 parts (more preferably 55–65 parts) of the inorganic filler. When the phenolic resin comprises the resol and the novolak in combination, the phenolic resin molding material is mainly composed of 20–40 parts (more preferably 25–35 parts) of the resol, 3–15 parts (more preferably 5–12 parts) of the novolak, the total amount of the resol and the novolak being 25–55 parts (more preferably 30–40 parts), 3,10 parts (more preferably 5–9 parts) of the partially crosslinked NBR, and 35–65 parts (more preferably 45–60 parts) of the inorganic filler. Furthermore, the above material is uniformly mixed with additives generally used for phenolic resin molding materials, such as pigments, releasing agents and curing accelerators and then, the mixture is kneaded under heating by rolls, Ko-kneader, twin screw extruder and others and then ground. In this way, the phenolic resin molding materials of the present invention can be produced.

When the amount of the phenolic resin component is less than 25 parts, moldability tends to deteriorate because of the less resin content and various characteristics of the molded articles deteriorate. When the amount of the phenolic resin component is more than 55 parts, operability in preparation of the molding materials is inferior and the volatile matter which evaporates at curing increases and thus, injection molding of the material is difficult. Besides, molding shrinkage increases and strength of the molded articles tends to decrease. If necessary, before cooling the kneaded product can be pelletized by an extrusion pelletizer.

When the amount of the partially crosslinked NBR is less than 2 parts, effect to improve impact resistance or flexibility is small, and when it is more than 10 parts, the melt viscosity is high and the kneading is apt to become difficult in preparation of the molding materials and heat resistance of the molded articles decreases.

When the amount of the inorganic filler is less than 35 parts, operability in preparation of the molding materials is inferior because of the lower proportion of the inorganic filler and besides, the volatile matter which evaporates at curing increases and so the injection molding becomes difficult. Moreover, molding shrinkage increases and strength of the molded articles also decreases. When it is more than 70 parts, the moldability decreases and various characteristics of the molded articles also deteriorate.

The phenolic resin molding material of the present invention contains the resol or at least 60% of the resol and novolak in combination as the phenolic resin and in addition the partially crosslinked NBR and the inorganic filler such as glass fiber incorporated therein. Therefore, the material is superior in mechanical strength and impact resistance or flexibility and excellent in heat resistance and flowability in molding. Thus, the material is also suitable for being molded into articles of complicated shapes and markedly promotes substitution of plastic parts for metallic parts such as the parts of automobiles. The material can be applied preferably to starter motor parts mounted in the engine rooms of automobiles and commutators which require high heat resistant strength.

The invention is illustrated by the following examples and comparative examples.

EXAMPLE 1

| | | |
|---|---|---|
| (A) | Methylol-type resol (PR-51141 manufactured by Sumitomo Durez Co.) | 18 parts |
| (B) | Dimethylene ether-type resol (PR-53529 manufactured by Sumitomo Durez Co.) | 17 parts |
| (C) | Partially crosslinked NBR PNC-38 (manufactured by Japan Synthetic Rubber Co., Ltd.; crosslinking degree: 0.8%; SP value: 9.7) | 4.5 parts |
| (D) | Glass fiber (ESCO15B154H manufactured by Nippon Electric Glass Co.) | 40 parts |
| (E) | Calcined clay | 20 parts |
| (F) | Pigment, releasing agent and others | 4 parts |

The above components were uniformly mixed and kneaded by heated rolls to prepare a molding material.

EXAMPLE 2

| | | |
|---|---|---|
| (A) | Methylol type-resol (PR-51141 manufactured by Sumitomo Durez Co.) | 20 parts |
| (B) | Dimethylene ether-type resol (PR-53529 manufactured by Sumitomo Durez Co.) | 10 parts |
| (C) | Partially crosslinked NBR PNC-38 (manufactured by Japan Synthetic Rubber Co., Ltd.) | 3 parts |
| (D) | Glass fiber (ESCO15B154H manufactured by Nippon Electric Glass Co.) | 55 parts |
| (E) | Calcined clay | 10 parts |
| (F) | Pigment, releasing agent and others | 4 parts |

The above components were uniformly mixed and kneaded by heated rolls to prepare a molding material.

COMPARATIVE EXAMPLE 1

| | | |
|---|---|---|
| (A) | Methylol-type resol (PR-51141 manufactured by Sumitomo Durez Co.) | 18 parts |
| (B) | Dimethylene ether-type resol (PR-53529 manufactured by Sumitomo Durez Co.) | 17 parts |
| (C) | Carboxyl-modified NBR PNC-25 (manufactured by Japan Synthetic Rubber Co., Ltd.; SP value: 9.3, carboxyl group: 4 mol %) | 3 parts |
| (D) | Glass fiber (ESCO15B154H manufactured by Nippon Electric Glass Co.) | 50 parts |
| (E) | Calcined clay | 10 parts |
| (F) | Pigment, releasing agent and others | 4 parts |

The above components were uniformly mixed and kneaded by heated rolls to prepare a molding material.

COMPARATIVE EXAMPLE 2

| | | |
|---|---|---|
| (A) | Methylol-type resol (PR-51141 manufactured by Sumitomo Durez Co.) | 20 parts |
| (B) | Dimethylene ether-type resol (PR-53529 manufactured by Sumitomo Durez Co.) | 10 parts |
| (C) | Normal NBR PN-20HA (manufactured by Japan Synthetic Rubber Co., Ltd.; SP value: 9.6) | 3 parts |
| (D) | Glass fiber (ESCO15B154H manufactured by Nippon Electric Glass Co.) | 55 parts |
| (E) | Calcined clay | 10 parts |
| (F) | Pigment, releasing agent and others | 4 parts |

The above components were uniformly mixed and kneaded by heated rolls to prepare a molding material.

Evaluation results as shown in Table 1 were obtained in Examples 1-2 and Comparative Examples 1-2.

TABLE 1

| Properties | Example 1 | Example 2 | Comparative Example 1 | Comparative Example 2 |
|---|---|---|---|---|
| Mono-hole flow (g) | 28 | 27 | 10 | 29 |
| Flexural strength (N/mm$^2$) | 170 | 180 | 170 | 150 |
| Heat distortion temperature (°C.) | >300 | >300 | >300 | 280 |
| Shaft forcing property | | | | |
| Breaking load (N) | 5980 | 6620 | 6280 | 5690 |
| Increase in inner diameter (mm) | 0.33 | 0.28 | 0.30 | 0.30 |

In Examples 1 and 2, the dimethylene ether-type resol and the methylol-type resol were used in combination as the resol and a suitable amount of the partially crosslinked NBR was added. Therefore, molding materials superior in flexural strength and excellent in heat resistance were obtained without causing deterioration in other properties.

In Comparative Example 1, the carboxyl-modified NBR was used in place of the partially crosslinked NBR and the resulting molding material was good in flexural strength and shaft forcing property, but conspicuous in reduction of moldability and thus low in utility. In Comparative Example 2, the normal NBR was used in place of the partially crosslinked NBR and the resulting molding material was inferior in flexural strength and heat resistance.

EXAMPLE 3

| | | |
|---|---|---|
| (A) | Dimethylene ether-type resol (PR-53529 manufactured by Sumitomo Durez Co.) | 25.5 parts |
| (B) | Novolak having a weight-average molecular weight of 6500 (molar ratio of formaldehyde/phenol at starting of reaction: 0.88; catalyst: oxalic acid; o/p = 0.8) | 10.5 parts |
| (C) | Partially crosslinked NBR PNC-38 (manufactured by Japan Synthetic Rubber Co., Ltd.) | 8 parts |
| (D) | Glass fiber (ESCO15B154H manufactured by Nippon Electric Glass Co.) | 51.5 parts |
| (E) | Pigment, releasing agent and others | 4.5 parts |

The above components were uniformly mixed and kneaded by heated rolls to prepare a molding material.

EXAMPLE 4

| | | |
|---|---|---|
| (A) | Methylol-type resol (PR-51141 manufactured by Sumitomo Durez Co.) | 30 parts |
| (B) | Novolak having a weight-average molecular weight of 5000 (molar ratio of formaldehyde/phenol at starting of reaction: 0.83; catalyst: hydrochloric acid; o/p = 0.75) | 10 parts |
| (C) | Partially crosslinked NBR PNC-38 (manufactured by Japan Synthetic Rubber Co., Ltd.) | 8 parts |
| (D) | Glass fiber (RES015BM38 manufactured by Nippon Glass Fiber Co.) | 50 parts |
| (E) | Pigment, releasing agent and others | 5 parts |

The above components were uniformly mixed and kneaded by heated rolls to prepare a molding material.

COMPARATIVE EXAMPLE 3

| | | |
|---|---|---|
| (A) | Dimethylene ether-type resol (PR-53529 manufactured by Sumitomo Durez Co.) | 25.5 parts |

-continued

| | | |
|---|---|---|
| (B) | Novolak having a weight-average molecular weight of 6500 (The same as in Example 3) | 10.5 parts |
| (C) | Carboxyl-modified NBR PNC-25 (manufactured by Japan Synthetic Rubber Co., Ltd.; SP value: 9.3, carboxyl group: 4 mol %) | 8 parts |
| (D) | Glass fiber (ESCO15B154H manufactured by Nippon Electric Glass Co.) | 51.5 parts |
| (E) | Pigment, releasing agent and others | 4.5 parts |

The above components were uniformly mixed and kneaded by heated rolls to prepare a molding material.

COMPARATIVE EXAMPLE 4

| | | |
|---|---|---|
| (A) | Novolak having a weight-average molecular weight of 5000 (The same as in Example 4) | 34 parts |
| (B) | Hexamethylenetetramine | 6 parts |
| (C) | Partially crosslinked NBR PNC-38 (manufactured by Japan Synthetic Rubber Co., Ltd.) | 8 parts |
| (D) | Glass fiber (ESCO15B154H manufactured by Nippon Electric Glass Co.) | 47 parts |
| (E) | Pigment, releasing agent and others | 5 parts |

The above components were uniformly mixed and kneaded by heated rolls to prepare a molding material.

Evaluation results as shown in Table 2 were obtained on Examples 3–4 and Comparative Examples 3–4.

TABLE 2

| Properties | Example 3 | Example 4 | Comparative Example 3 | Comparative Example 4 |
|---|---|---|---|---|
| Mono-hole flow (g) | 28 | 31 | 12 | 30 |
| Flexural strength (N/mm²) | 220 | 180 | 240 | 180 |
| Heat distortion temperature (°C.) | 285 | 280 | 285 | 220 |
| Charpy impact strength (KJ/m²) | 11.5 | 9.0 | 11.5 | 4.5 |

In Examples 3 and 4, the resulting molding materials had high flexural strengths of 220 N/mm² and 180 N/mm² and Charpy impact strengths of 11.5 KJ/m² and 9.0 KJ/m². These are very high strengths for phenolic resin molding materials capable of being injection-molded. Furthermore, no decrease in heat distortion temperature was seen.

In Comparative Example 3, the carboxyl-modified NBR was used and the resulting molding material had strength and heat resistance similar to those of the phenolic resin compositions of the present invention. However, it showed remarkable deterioration in moldability and was low in utility. In Comparative Example 4, the partially crosslinked NBR was added to the system comprising the novolak and hexamethylenetetramine. In this case, improvement in impact strength by addition of the partially crosslinked NBR was small.

Methods for Measurement of the Properties (1) Mono-hole flow: This was measured in accordance with JIS K 6911 with a mold temperature of 140° C. and a pressure of 150 kgf/cm².

(2) Flexural strength: A test piece prepared by transfer molding in accordance with JIS K 6911 was subjected to heat aging for 8 hours at 180° C. and then the flexural strength was measured by Tensilon (Toyo Baldwin Co.).

(3) Heat distortion temperature: A test piece prepared by transfer molding in accordance with ASTM D648 was subjected to heat aging for 8 hours at 180° C. and then the heat distortion temperature was measured by a heat distortion temperature tester manufactured by Toyo Seiki Co.

(4) Charpy impact strength: A test piece prepared by transfer molding in accordance with JIS K 6911 was subjected to heat aging for 8 hours at 180° C. and then the Charpy impact strength was measured by a Charpy impact tester.

(5) Shaft forcing property: A cylinder of 33 mm in outer diameter, 11 mm in inner diameter and 35 mm in length was prepared from the molding material by transfer molding in accordance with JIS K6911. A copper wire was wound round the cylinder and a taper pin having a taper of 0.5/80 was forced into the cylinder at a speed of 5 mm/min, and when the cylinder was broken, the load and the increase of the inner diameter [namely, the inner diameter at the breaking—the original diameter (11 mm)] were measured.

What is claimed is:

1. A phenolic resin molding material which is mainly composed of (1) 25–55 parts by weight of a phenolic resin containing 60% by weight or more of a resol phenolic resin, (2) 2–10 parts by weight of a partially crosslinked NBR, and (3) 35–70 parts by weight of an inorganic filler, on the basis of 100 parts by weight in total of these components.

2. A phenolic resin molding material which is mainly composed of (1) 25–55 parts by weight of a resol phenolic resin, (2) 2–8 parts by weight of a partially crosslinked NBR, and (3) 40–70 parts by weight of an inorganic filler, on the basis of 100 parts by weight in total of these components.

3. A phenolic resin molding material according to claim 2 wherein the resol phenolic resin consists of a dimethylene ether resol and a methylol resol.

4. A phenolic resin molding material according to claim 2 wherein the inorganic filler contains 50% by weight or more of glass fibers.

5. A phenolic resin molding material which is mainly composed of (1) 20–40 parts by weight of a resol phenolic resin, (2) 3–15 parts by weight of a novolak phenolic resin, (3) 3–10 parts by weight of a partially crosslinked NBR, and (4) 35–65 parts by weight of an inorganic filler, on the basis of 100 parts by weight in total of these components.

6. A phenolic resin molding material according to claim 5 wherein the resol phenolic resin is at least one phenolic resin selected from the group consisting of a methylol resol phenolic resin and a dimethylene ether resol phenolic resin, and the novolak phenolic resin has a weight-average molecular weight of 5,000–9,000.

7. A phenolic resin molding material according to claim 5 wherein the inorganic filler contains 50% by weight or more of glass fibers.

* * * * *